United States Patent
Ou et al.

(10) Patent No.: US 7,814,521 B2
(45) Date of Patent: Oct. 12, 2010

(54) SYSTEM AND METHOD FOR DELIVERING PERSONALIZED ADVERTISING DATA

(75) Inventors: Canhui Ou, Danville, CA (US); Zhi Li, San Ramon, CA (US); Yali Liu, Davis, CA (US)

(73) Assignee: ATT Knowledge Venturers, L.P., Reno, NV (US)

( * ) Notice: Subject to any disclaimer, the term of this patent is extended or adjusted under 35 U.S.C. 154(b) by 473 days.

(21) Appl. No.: 11/789,696

(22) Filed: Apr. 25, 2007

(65) Prior Publication Data

US 2008/0271068 A1 Oct. 30, 2008

(51) Int. Cl.
- *H04N 7/10* (2006.01)
- *H04N 7/173* (2006.01)
- *G06F 15/16* (2006.01)

(52) U.S. Cl. .............. 725/96; 725/97; 725/34

(58) Field of Classification Search ............ 725/34–35, 725/46, 93–97; 709/205, 226–228
See application file for complete search history.

(56) References Cited

U.S. PATENT DOCUMENTS

| | | | |
|---|---|---|---|
| 5,583,561 A * | 12/1996 | Baker et al. | 725/93 |
| 6,704,576 B1 | 3/2004 | Brachman et al. | |
| 7,500,258 B1 * | 3/2009 | Eldering | 725/32 |
| 2002/0067730 A1 | 6/2002 | Hinderks et al. | |
| 2004/0228276 A1 * | 11/2004 | Courtney | 370/230 |
| 2006/0010467 A1 | 1/2006 | Segel | |
| 2007/0204292 A1 * | 8/2007 | Riedl et al. | 725/34 |
| 2008/0034386 A1 * | 2/2008 | Cherry et al. | 725/35 |

* cited by examiner

*Primary Examiner*—Andrew Y Koenig
*Assistant Examiner*—Carmine Malangone
(74) *Attorney, Agent, or Firm*—G. Michael Roebuck (57) ABSTRACT

A method is disclosed for distributing advertising data in an internet protocol television (IPTV) system, the method including dividing a plurality of end user devices in the IPTV system into K advertising groups; multicasting J advertising data multicast groups to end user devices in J advertising groups having a percentile ranking above or equal to a predetermined percentile ranking; and unicasting advertising data channels for actively viewed IPTV channels being viewed by other end users.

16 Claims, 5 Drawing Sheets

SYSTEM AND METHOD FOR DELIVERING PERSONALIZED ADVERTISING DATA

FIELD OF THE DISCLOSURE

The present disclosure relates to the field of delivering personalized advertising data.

BACKGROUND OF THE DISCLOSURE

Targeted advertisements have historically been sent to large targeted geographic areas such as a particular city, so that regional advertisers reach only those advertisement recipients who are deemed by the advertiser as most likely to be responsive to their advertisements.

Advertisers can potentially save advertising dollars by targeting their advertisements rather than indiscriminately broadcasting their advertisements to a general population of recipients.

DETAILED DESCRIPTION

In a first illustrative embodiment, a method for distributing advertising data in an internet protocol television (IPTV) system is disclosed, the method including dividing a plurality of end user devices in the IPTV system into K advertising groups, wherein the groups are based on end user profile data for the plurality of end user devices; determining a percentile ranking for end user device profiles among a plurality of end user device profiles; multicasting J advertising data multicast groups to end user devices in J advertising groups having a percentile ranking above or equal to a predetermined percentile ranking; and unicasting advertising data channels to a fourth integer, I end users having a percentile ranking below a predetermined percentile ranking. In another embodiment, advertising data are unicast or multicast only for active IPTV channels that have been requested from the IPTV system, that is, IPTV channels that are "being viewed." In another particular embodiment of the method, the method further includes sending N IPTV channels to an IPTV server that serves the end user devices for multicasting to the end user devices. In another particular embodiment, IF K is less than a first integer, M, replicating each of N IPTV channels for each of the K advertising groups; inserting into each replicated IPTV channel in each advertising group, advertising data selected for the advertising group; and sending the N times K IPTV channels to an IPTV server close to the end user devices. In another particular illustrative embodiment, in the method the predetermined percentile ranking, I, J, and M are selected based on IPTV system available bandwidth between the IPTV server and the end user devices. In another particular illustrative embodiment, in the method the predetermined percentile ranking is substantially 80%. In another particular illustrative embodiment, the method further includes sending channel assignment data to the end user devices indicating internet protocol addresses for IPTV channels and advertising data for the IPTV channels. In another particular illustrative embodiment, in the method the advertising data in the J multicast groups are inserted into one of the N IPTV channels at an end user devices in the J advertising groups at the end user device and wherein the advertising data in the unicast groups are inserted into one of the N IPTV channels at the end user devices in the I advertising groups at an end user device.

In another particular embodiment, IF K is less than a first integer, M, replicating each of N IPTV channels for each of the K advertising groups; inserting into each replicated IPTV channel in each advertising group, advertising data selected for the advertising group; and sending the N times K IPTV channels to an IPTV server close to the end user devices.

In another particular illustrative embodiment, a system for distributing advertising data in an internet protocol television (IPTV) system is disclosed, the system including but not limited to a computer readable memory; a processor in data communication with the memory; and a computer program embedded in the memory, the compute program further comprising instructions to divide a plurality of end user devices in the IPTV system into K advertising groups based on end user profile data for the plurality of end user devices; instructions to, IF K is less than a first integer, M, replicate each of N IPTV channels for each of the K advertising groups; insert into each replicated IPTV channel in each advertising group, advertising data selected for the advertising group and send the N times K channels to an IPTV server close to the end user devices; and instructions to, IF K is greater than or equal to M, send N IPTV channels to an IPTV server close to the end user devices; determine a percentile ranking for end user device profiles among a plurality of end user device profiles; multicast J advertising data multicast groups to end user devices in J advertising groups having a percentile ranking above or equal to a predetermined percentile ranking; and unicast advertising data channels for active IPTV channels being viewed to a fourth integer, I end users having a percentile ranking below a predetermined percentile ranking. In another particular illustrative embodiment, in the system the predetermined percentile ranking, I, J, and M are selected based on IPTV system available bandwidth between the IPTV server and the end user devices. In another particular illustrative embodiment, in the system the predetermined percentile ranking is substantially 80%. In another particular illustrative embodiment, in the system, the computer program further includes instructions to send channel assignment data to the end user devices indicating internet protocol addresses for IPTV channels and advertising data for the IPTV channels. In another particular illustrative embodiment, in the system the advertising data in the J multicast groups are inserted into one of the N IPTV channels at an end user devices in the J advertising groups at the end user device and wherein the advertising data in the unicast groups are inserted into one of the N IPTV channels at the end user devices in the I advertising groups at an end user device.

In another particular illustrative embodiment, a computer readable medium is disclosed containing a computer program, useful for distributing advertising data in an internet protocol television (IPTV) system, the computer program including but not limited to instructions to divide a plurality of end user devices in the IPTV system into K advertising groups based on end user profile data for the plurality of end user devices; instructions to, IF K is less than a first integer, M, replicate each of N IPTV channels for each of the K advertising groups; insert into each replicated IPTV channel in each advertising group, advertising data selected for the advertising group and send the N times K channels to an IPTV server close to the end user devices; and instructions to, IF K is greater than or equal to M, send N IPTV channels to an IPTV server close to the end user devices; determine a percentile ranking for end user device profiles among a plurality of end user device profiles; multicast J advertising data multicast groups to end user devices in J advertising groups having a percentile ranking above or equal to a predetermined percentile ranking; and unicast advertising data channels for active IPTV channels being viewed to a fourth integer, I end users having a percentile ranking below a predetermined percentile ranking. In another particular illustrative embodiment, in the medium the predetermined percentile ranking, I, J, and M are selected based on IPTV system available bandwidth between the IPTV server and the end user devices. In another particular illustrative embodiment, in the medium the predetermined percentile ranking is substantially 80%. In another particular illustrative embodiment, in the medium the computer program further includes instructions to send channel assignment data to the end user devices indicating internet protocol addresses for IPTV channels and advertising data for the IPTV channels. In another particular illustrative embodiment, in the medium the advertising data in the J multicast groups are inserted into one of the N IPTV channels at an end user devices in the J advertising groups at the end user device and wherein the advertising data in the unicast groups are inserted into one of the N IPTV channels at the end user devices in the I advertising groups at an end user device.

In another particular illustrative embodiment, a data structure embedded in a computer readable medium is disclosed, the data structure including by not limited to a first field for containing data indicative of a predetermined percentile ranking for determining, based on a percentile ranking for profile data for an end user device, whether an end user will receive advertising data selected from the group consisting of an advertising data multicast and an advertising data unicast. In another particular illustrative embodiment, the data structure further includes a second field for containing data indicative of available bandwidth between an IPTV server and the end user device for determining the predetermined percentile ranking. In another particular illustrative embodiment, the data structure further includes a third field for containing data indicative of channel assignments for advertising data unicast groups for end user devices in a percentile ranking below the predetermined percentile. In another particular illustrative embodiment, the data structure further includes a fourth field for containing data indicative of channel assignments for advertising data multicast groups for end user devices in a percentile ranking above or equal to the predetermined percentile. In another particular illustrative embodiment, the data structure further includes a fifth field for containing data indicative of channel assignments for IPTV channels when a number, N of IPTV channels are replicated in a second number, K of advertising groups.

In another particular illustrative embodiment, a method for receiving advertising data in an IPTV system is disclosed, the method including but not limited to receiving at an IPTV end user device from an IPTV server, a channel assignment for an IPTV channel containing advertising data targeted to an IPTV subscriber associated with the end user device; accepting a channel request at the end user device from the IPTV subscriber; and joining a first IP address identified in the channel assignment to receive data for the requested IPTV channel from the IPTV system. In another particular illustrative embodiment of the method, the IP address further comprises an address selected from the group consisting of a unicast address and a multicast address, the method further including joining a second IP address identified in the channel assignment to receive advertising data targeted to the IPTV subscriber; and inserting the advertising data in to requested IPTV channel data. In another particular illustrative embodiment, a system for receiving advertising data in an IPTV system is disclosed, the system including but not limited to a computer readable memory; a processor in data communication with the computer readable memory, the processor further including a first interface for receiving at an IPTV end user device from an IPTV server, a channel assignment for an IPTV channel containing advertising data targeted to an IPTV subscriber associated with the end user device; a second interface for accepting a channel request at the end user device from the IPTV subscriber; and a third interface for joining a first IP address identified in the channel assignment to receive data for the requested IPTV channel from the IPTV system. In another particular embodiment of the system, the processor further includes a fourth interface for joining a second IP address identified in the channel assignment to receive advertising data targeted to the IPTV subscriber; and a fifth interface for inserting the advertising data in to requested IPTV channel data. In another particular illustrative embodiment, a computer readable medium, containing a computer program useful for receiving advertising data in an IPTV system is disclosed, the computer program including but not limited to instructions receive at an IPTV end user device from an IPTV server, a channel assignment for an IPTV channel containing advertising data targeted to an IPTV subscriber associated with the end user device; instructions to accept a channel request at the end user device from the IPTV subscriber; and instructions to join a first IP address identified in the channel assignment to receive data for the requested IPTV channel from the IPTV system.

Advertisement distributors and providers that enable a targeting advertisement model can increase their revenue per advertisement impression by providing targeted advertisement options for advertisers. In the targeted advertising model, advertising data or commercials are inserted into different video data streams or programs are based on the characteristics of such programs: genre (sports, reality, drama, etc), likely audience, inferred interests of likely audience, and popularity. For example, more commercials on energy and alcohol drinks can be inserted into sports programs than other programs.

Targeting commercials based on television programs targets regional demographics of individuals in a particular region rather than the individuals. One of the main reasons that TV commercials are targeted to demographics, rather than individuals, is that TV programs are broadcast to subscribers in the same region, and, as a result, all the subscribers in the same region receive the same content and the same commercials. In an illustrative embodiment, targeted advertising is directed to individuals or groups of individuals based on their interests and demographics derived from subscriber or end user profiles for the individuals.

The IPTV system collects data from STBs and the IPTV system derives the following subscriber related statistics from the data, including but not limited to channels watched and timestamps, programs watched and timestamps, programs recorded, videos ordered via on demand. Additionally, ecommerce purchases, internet surfing history, video on demand purchases associated with the IPTV system can be stored in the subscriber profile data. The above statistics and subscriber profile data are stored in the subscriber profiles so that the subscriber profiles are continuously updated in a "self learning mode" so that division of the subscriber profiles into multicast advertising groups and unicast to individual end users based on a percentile ranking is dynamic. That is, based on changes in the continuously updated subscriber profile data, the division of subscriber profiles into various multicast advertising groups or unicast to individuals, changes dynamically in near real time as subscriber profile data changes are stored in the subscriber profiles. The available IPTV bandwidth can also change dynamically as IPTV system demand varies, thus, those parameters for dividing the subscriber profiles that change based on available IPTV bandwidth, vary as the available bandwidth varies causing the division of end user profiles into advertising groups to vary dynamically along with IPTV available bandwidth.

A subscriber or end user profile can be built by correlating such statistics and subscriber profile data along with other information such as gender, age, income, languages spoken, areas of interest, etc. volunteered by a subscriber during an IPTV registration process. The video profile information will contain data for which a subscriber has opted in for monitoring and use by the IPTV system for the purposes of receiving targeted advertising data. Subscriber interests can be inferred based on the subscriber profile data. Based on subscribers' interest and background profiling results, one of the following targeted advertising data delivery described herein or an equivalent thereof can be utilized to provide personalized advertising data and commercial delivery.

A first illustrative embodiment focuses on the scenario in which most of the subscribers can be categorized into a few profiles or advertising groups, such as sports, home & gardening, business, etc. The first illustrative embodiment can be more useful when most of the IPTV subscribers can be categorized into K profiles, where K is a small integer, for example, five or less. In the first illustrative embodiment each of N available IPTV channels is replicated into K multicast groups at the SHO, one replicated channel for each of K subscriber profiles. In an illustrative embodiment, the channel replication occurs at the SHO. At the SHO, inserted into each channel in each of the K multicast groups is the corresponding commercial targeted to each of the K subscriber profiles. The SHO broadcasts all the channels to a location such as a CO server which is close to the IPTV end users or subscribers. When a subscriber wants to view a particular channel, the subscriber enters a channel request to an STB associated with the subscriber. The subscriber's STB then uses channel assignments received from the SHO to map the subscriber channel request such that the subscriber joins one of the K multicast groups (TV channels) with commercials targeted to the subscriber's profile. Minimum changes to existing IPTV delivery platforms are required.

The first illustrative embodiment utilizes K times more bandwidth than ordinary distribution of N IPTV channels. In the second illustrative embodiment, less bandwidth is utilized as all the N IPTV channels are delivered; however, the slots for commercials are left empty so that no bandwidth is wasted. Moreover, the N IPTV channels are not replicated for each advertising group. Personalized commercials or advertising data for the actively viewed programs are delivered to a subscriber's STB at a reduced speed via unicast. The STB fills in the empty slots inserting the personalized advertising data or commercials. In MPEG, as long as the personalized commercials or advertising data starts with an MPEG I-frame, the personalized commercials will run smoothly with the regular program.

Given that K, the number of subscriber profiles, is unlikely to be large as, in general, about or substantially 80% of all IPTV subscribers can be categorized into top 20% of the subscriber profiles or advertising groups, another particular illustrative embodiment can be enhanced as follows. For each regular IPTV TV channel, there will be corresponding K multicast groups which are used to deliver personalized commercials to subscribers. When a subscriber tunes to a particular channel, the STB will join not only the multicast group for the regular IPTV TV channel, but also the multicast group for the targeted commercials personalized or advertising data directed to the subscriber. However, the personalized commercial or advertising data channels are multicast at a reduced speed (relative to a regular IPTV channel multicasts) via K streams, one stream for each subscriber profile.

The second illustrative embodiment has the advantage that the commercials delivered to a subscriber that entirely based on the subscriber's profile, and therefore, entirely personalized. Given that the commercials are delivered at a reduced speed, the increase in last-mile bandwidth is insignificant.

Figure 1:
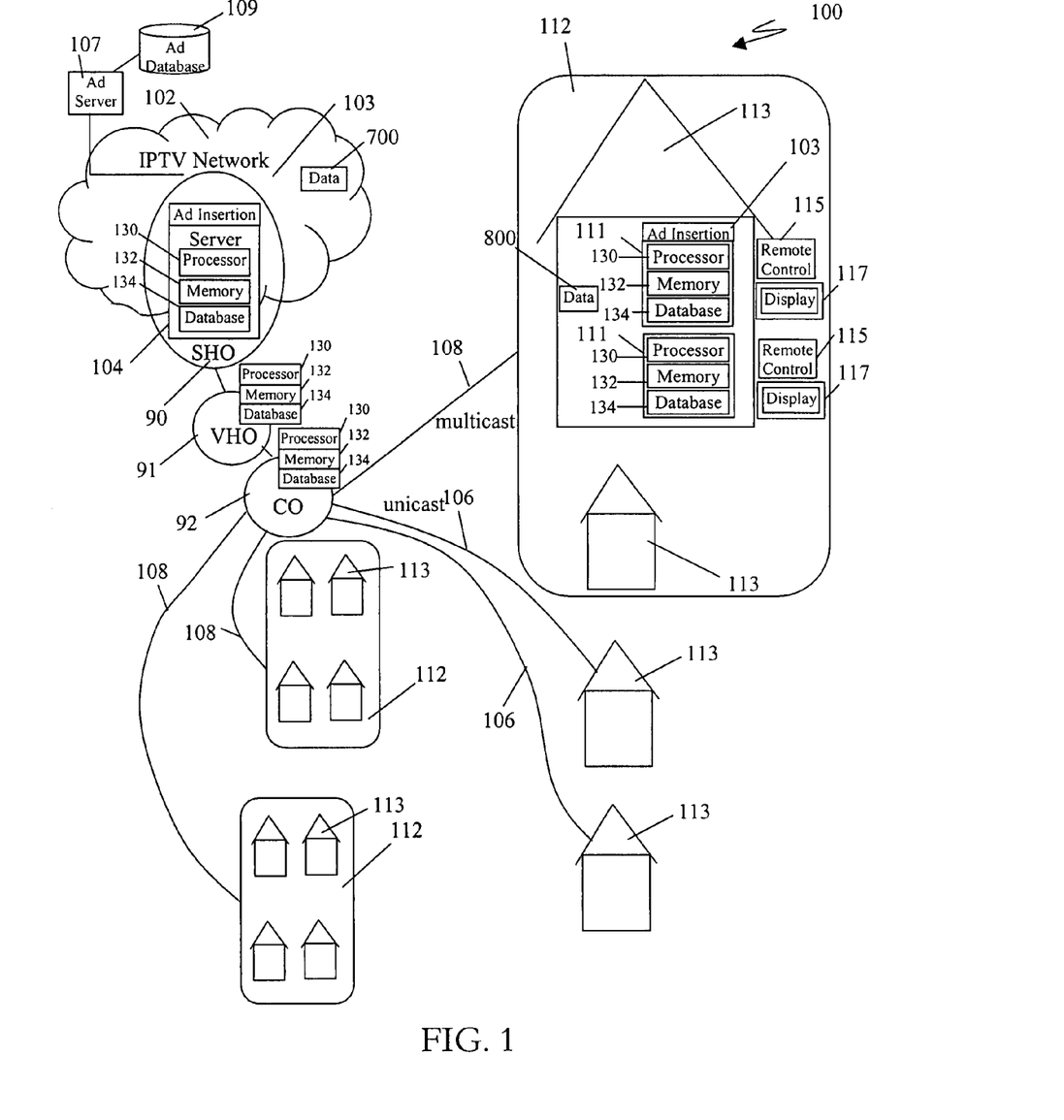
FIG. 1 depicts an illustrative embodiment of a system for delivering advertising data.

Turning now to FIG. 1, the IPTV system 102 delivers content and advertising to the server 104. In the IPTV system, ITPV channels are first broadcast from a super head end (SHO) 90 to a regional or local IPTV server, such as a central office (CO) server 92. The hierarchical IPTV system includes an hierarchically arranged network of servers wherein the SHO transmits data to a video head (VHO) 91 end server location close to a subscriber, such as a CO server; then, actively viewed channels are sent in an internet protocol (IP) data multicast group to the set-top boxes (STBs) at IPTV subscriber homes from the local server (CO). Each SHO, VHO, CO, and STB includes contains a processor 130, a memory 132 and a database 134. The server 104 delivers content via multicast and advertising data via unicast or multicast depending on the target advertising group of end user client devices to which the advertising data is directed.

As shown in FIG. 1 advertising groups 112 receive multicast 108 advertising data from server 104 at a STB 111. Individual households receive unicast 106 advertising data at set top box 111. More then one STB can be located in an individual household 113 and each individual STB can receive a separate unicast advertising stream 106. Having a separate advertising data displayed at each set top box (STB) 111 tailored to target the subscriber watching television at that particular STB. Each server 104 and STB 111 Each STB 111 has an associated remote control 115 and display 117.

FIG. 1 depicts an illustrative advertising insertion system wherein advertisings data can be inserted at the IPTV server or at the end user client device, for example, an STB. Advertising data can be inserted into an IPTV video stream via advertising insertion device 103 at the IPTV server 104 or the STB 111. The IPTV server includes an advertising server 107 and an advertising database 109. The advertising data is selected from the advertising database and delivered by the advertising server 107 to the IPTV server 104. The IPTV system includes a hierarchical set of servers that distribute video and advertising data. A super head end (SHO) distributes data to a video head end (VHO) which distributes data to regional central offices (CO) which distribute data to service area interface to end user devices such as a STB.

Figure 2:
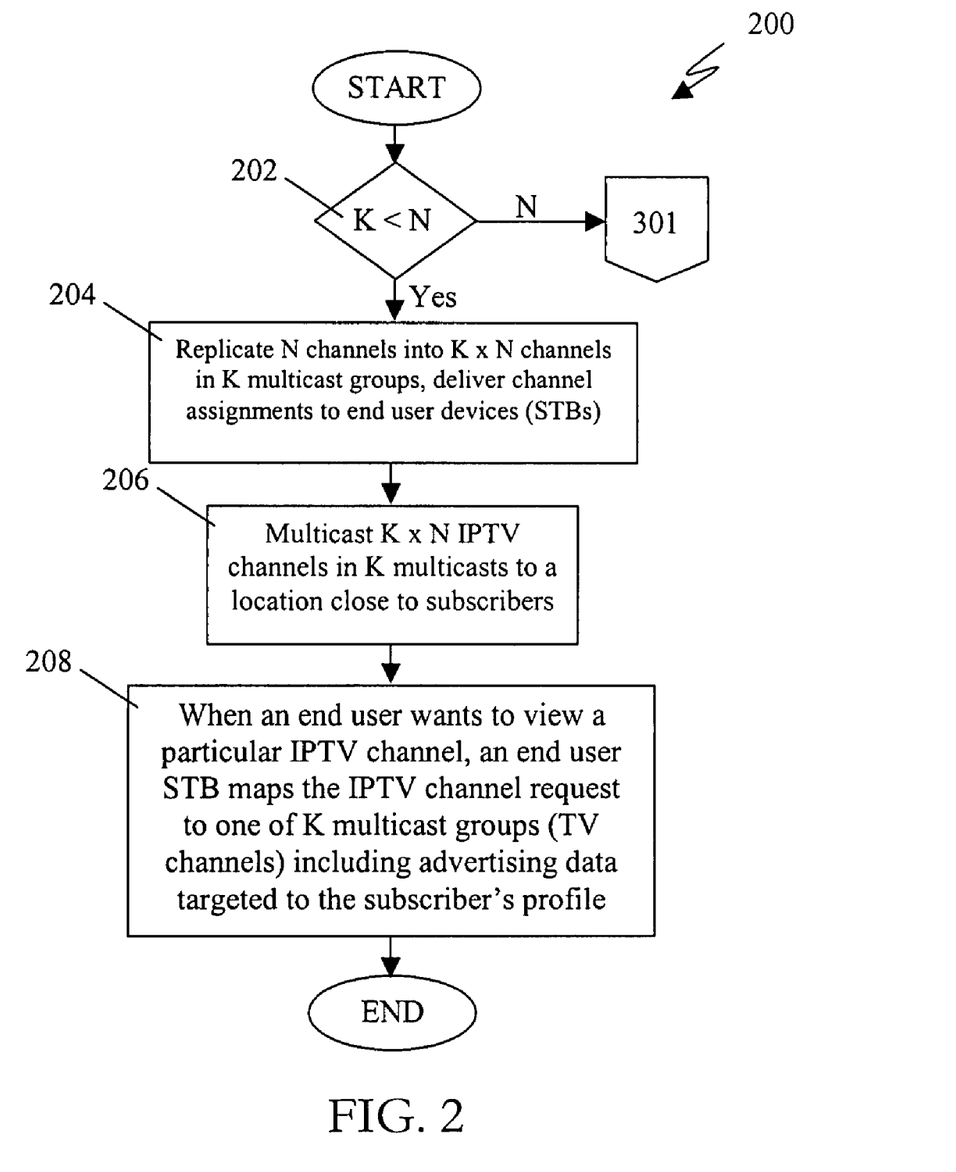
FIG. 2 depicts a flow chart of functions performed in an illustrative method for delivering advertising data.

Turning now to FIG. 2, FIG. 2 is a flow chart depicting functions performed in an illustrative embodiment where subscribers' end user devices are categorized into K advertising data groups, based on each subscriber end user profile. In a particular illustrative embodiment, where K is a small integer (for example, 5 or less) and K is less than M (for example 6) at block 202, each of the N IPTV channels are replicated in K multicast groups. Channel assignments consisting of which multicast IP address to join for advertising data associated with a given channel are delivered to each end user device member of each K multicast group at block 204.

For example, K×N IPTV channels are multicast (N channels in each of K multicast groups) to an IPTV CO server location close to end user devices associated with subscribers at block 206. When a subscriber wants to watch a particular IPTV channel, the subscriber enters or requests a channel number at the STB (for example, channel 33 for ESPN) and the STB maps the subscriber channel request (channel 33) to join one of K×N multicast groups (TV channels) with commercials targeted to the subscriber's profile at block 208. If there are five multicast groups (K=5), that is, there are five advertising groups and there are 100 channels, then the 100 channels are replicated five times, and 5×100 or 500 channels are multicast to the CO from the SHO. Each of the 100 channels is replicated as the SHO in each of the five multicast groups. Thus, when K=5 and N=100, a total of 500 channels are multicast from the IPTV server, for example, the SHO. Separate and distinct advertising data can be inserted into each of the N IPTV channels in each of the K multicast groups so that advertising data appropriate or targeted to the advertising group associated with the multicast group. Separate channels assignments are sent to each advertising group or multicast group. Thus, each STB or end user device will receive a channel assignment directing the STB to join a particular multicast group for their multicast group.

If there are 5 advertising groups (K=5) and 5 associated multicast groups, then each end user device associated with a member of a particular multicast group is sent a channel assignment for each of the 100 channels. For example, if ESPN is channel 33 and usually delivered on a particular multicast group address by the IPTV system, then each of the members of the five advertising groups could be sent a different channel assignment for channel 33 (advertising group 1, channel 33.1, advertising group 2, channel 33.2, advertising group 3, channel 33.3, advertising group 4, channel 33.4, advertising group 5, channel 33.5) and a multicast group address for each of the 5 versions of channel 33. Each of the five versions of channel 33 contains advertising data selected for the interests associated with the advertising group with which the channel version is associated.

Figure 3:
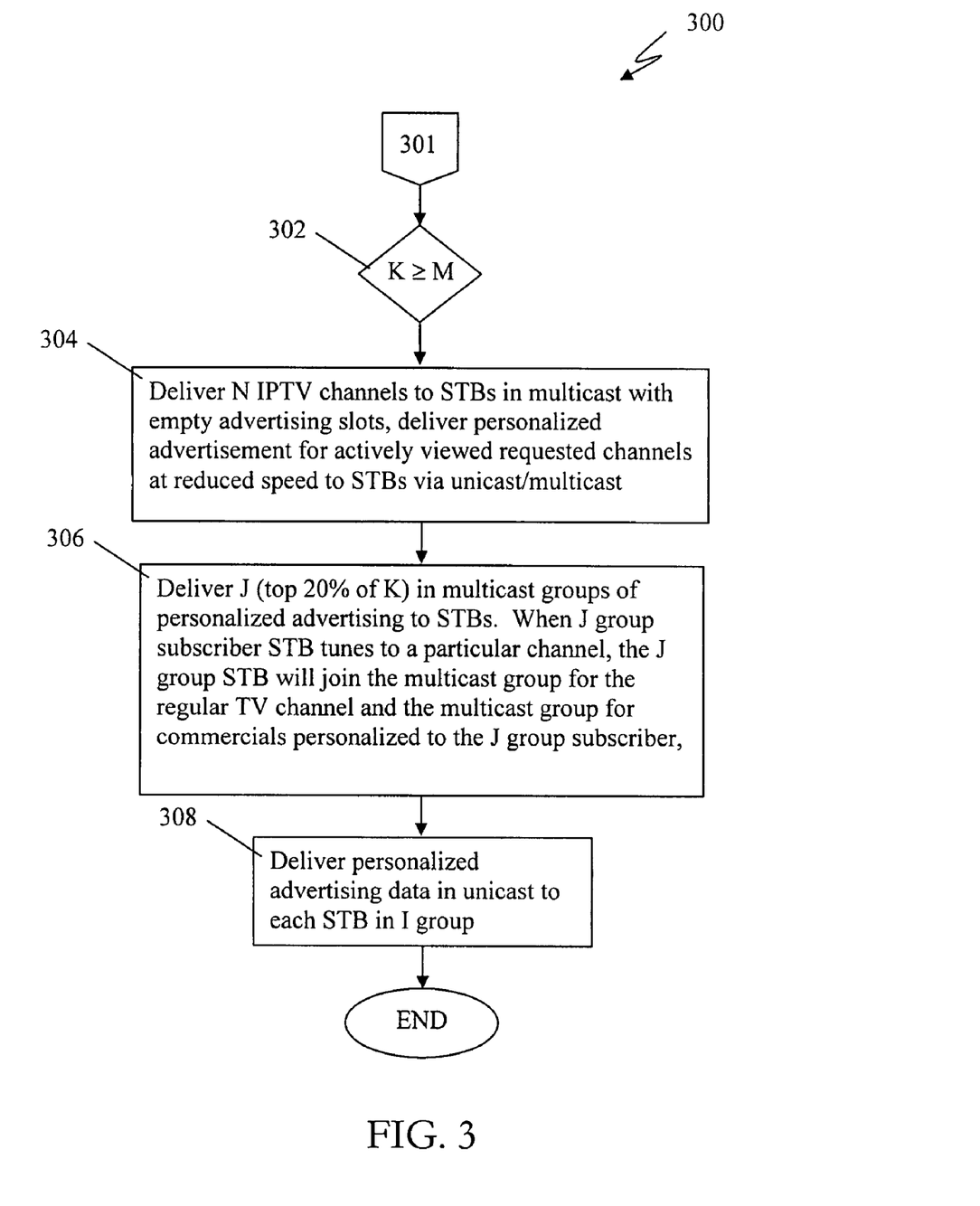
FIG. 3 depicts a flow chart of functions performed in another illustrative method for delivering advertising data.

Turning now to FIG. 3, FIG. 3 is a flow chart depicting functions performed in another illustrative embodiment. When K is relatively large, (for example, larger than 5) the number of advertising data groups K≧M, where M is an integer (for example, 5) selected based on available bandwidth in the IPTV network at block 302, N IPTV channels are delivered to STBs in multicast with empty advertising slots and personalized advertisements are delivered at reduced speed to STBs via unicast/multicast at block 304. It is expected that 80% of subscribers will fit within the top 20% of the K advertising groups. J multicast groups (where J is 20% of K) of personalized advertising are delivered to STBs. When one of the J group subscriber's STB tunes to a particular channel, the J group STB will join a first multicast group for the regular TV channel and a second multicast group for advertising data. The second multicast group contains advertising data delivered at lower speed, containing advertising data personalized to the J group subscriber at block 306. Personalized advertising data is delivered in unicast to each STB in the lower 20% of IPTV subscribers; the I group of subscribers at block 308.

Figure 4:
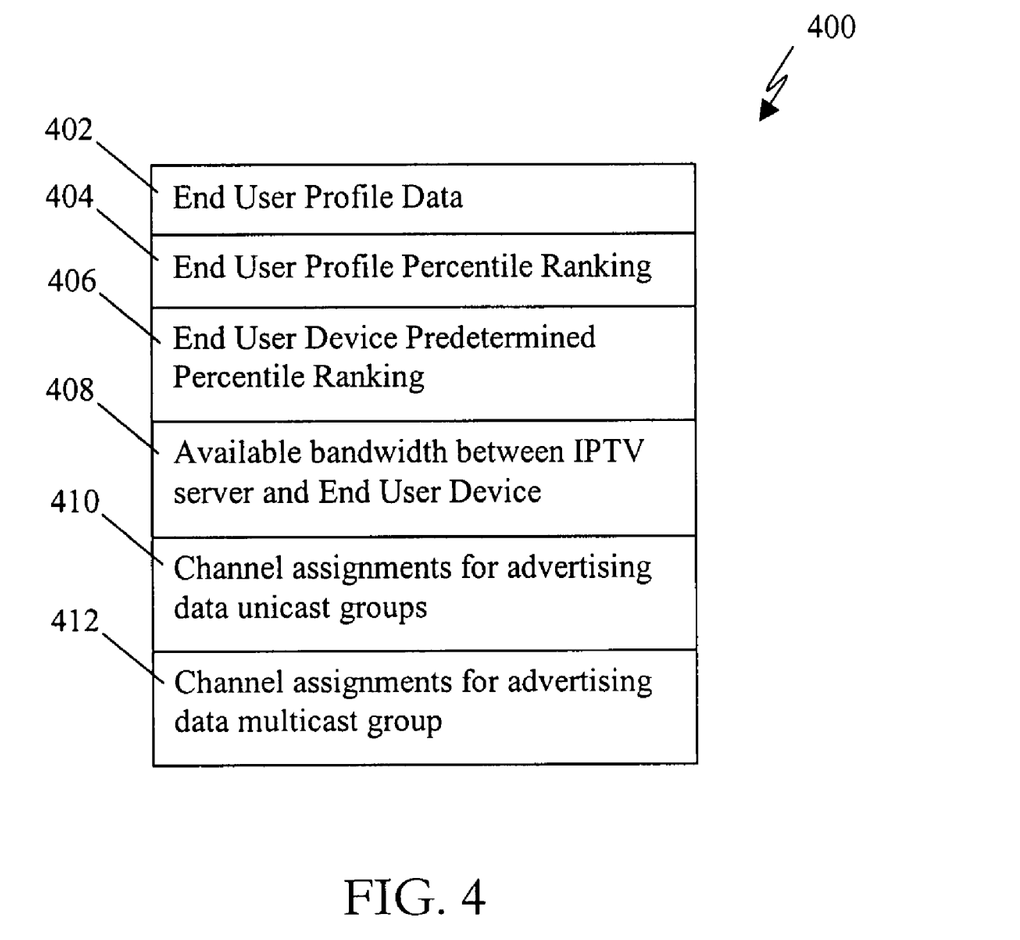
FIG. 4 depicts a data structure embedded in a computer readable medium that is used by a processor and method for delivering advertising data.

Turning now to FIG. 4, in a particular illustrative embodiment a data structure 400 embedded in a computer readable medium is provided. The data structure 400 includes fields for storing data used by an illustrative embodiment of a system and method. In data structure field 402 end user profile data field is illustrated for storing data indicative of end user profile data. The end user profile includes demographic data such as age, gender, location, income, etc. used by advertisers to select recipients for targeted advertising data. In data structure field 404, an end user profile percentile ranking field is illustrated for storing data indicative of end user profile percentile ranking data. In data structure field 406 an end user device predetermined percentile ranking field is illustrated for storing data indicative of end user profile device predetermined percentile ranking data. In an illustrative embodiment, the predetermined percentile ranking of 80% was used as an example percentile ranking, however, the predetermined percentile ranking can be adjusted based on the total number of advertising data groups (K) and the available bandwidth in the IPTV system. In data structure field 408 the available bandwidth between an IPTV CO server and end user device field is illustrated for storing data indicative of bandwidth between IPTV server and end user device data. In data structure field 410 channel assignments for advertising data unicast groups field is illustrated for storing data indicative of channel assignments for advertising data unicast group data. In data structure field 412 channel assignments for advertising data in multicast group field is illustrated for storing data indicative of channel assignments for advertising data in multicast group data.

Figure 5:
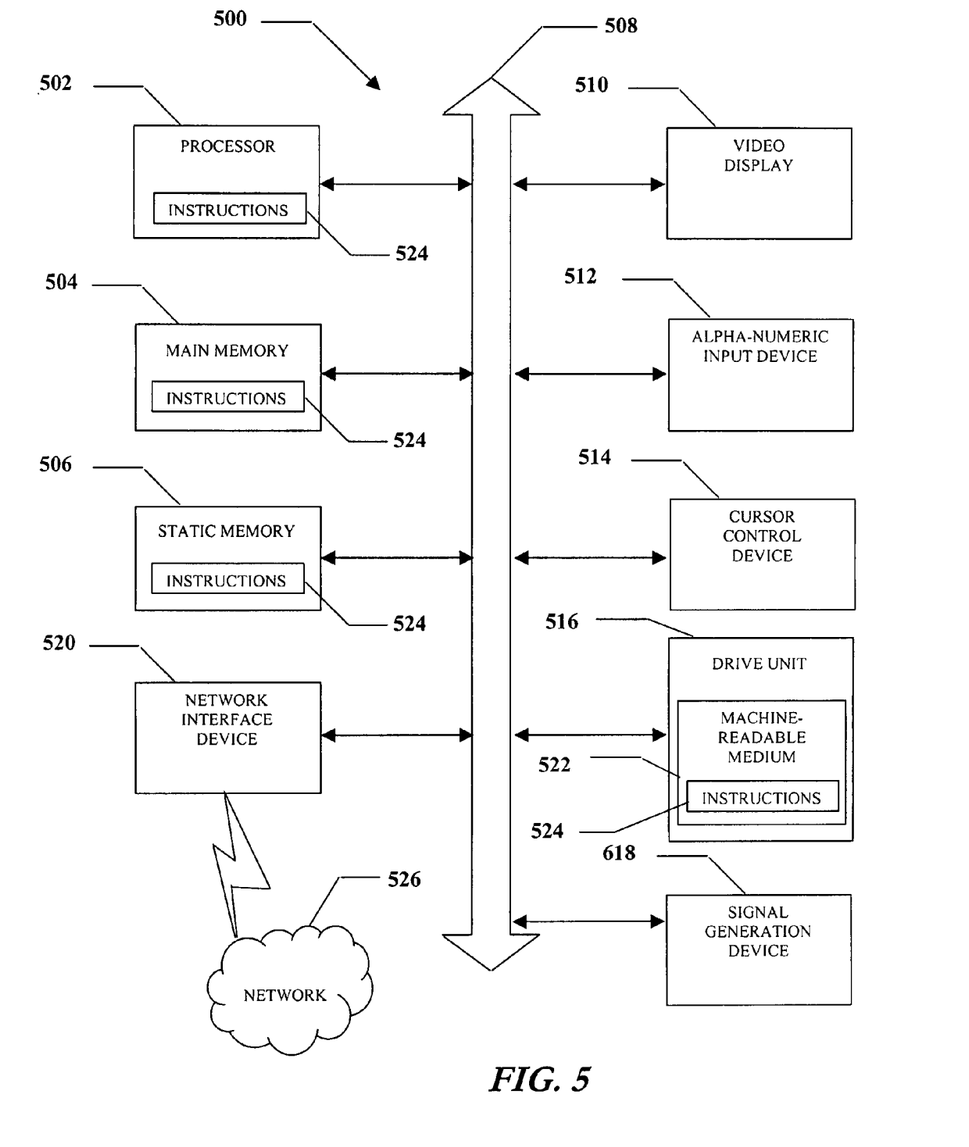
FIG. 5 is an illustrative embodiment of a machine for performing functions disclosed in an illustrative embodiment.

FIG. 5 is a diagrammatic representation of a machine in the form of a computer system 500 within which a set of instructions, when executed, may cause the machine to perform any one or more of the methodologies discussed herein. In some embodiments, the machine operates as a standalone device. In some embodiments, the machine may be connected (e.g., using a network) to other machines. In a networked deployment, the machine may operate in the capacity of a server or a client user machine in server-client user network environment, or as a peer machine in a peer-to-peer (or distributed) network environment. The machine may comprise a server computer, a client user computer, a personal computer (PC), a tablet PC, a set-top box (STB), a Personal Digital Assistant (PDA), a cellular telephone, a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any machine capable of executing a set of instructions (sequential or otherwise) that specify actions to be taken by that machine.

It will be understood that a device of the present invention includes broadly any electronic device that provides voice, video or data communication. Further, while a single machine is illustrated, the term "machine" shall also be taken to include any collection of machines that individually or jointly execute a set (or multiple sets) of instructions to perform any one or more of the methodologies discussed herein.

The computer system 500 may include a processor 502 (e.g., a central processing unit (CPU), a graphics processing unit (GPU), or both), a main memory 504 and a static memory 506, which communicate with each other via a bus 508. The computer system 500 may further include a video display unit 510 (e.g., liquid crystals display (LCD), a flat panel, a solid state display, or a cathode ray tube (CRT)). The computer system 500 may include an input device 512 (e.g., a keyboard), a cursor control device 514 (e.g., a mouse), a disk drive unit 516, a signal generation device 518 (e.g., a speaker or remote control) and a network interface.

The disk drive unit 516 may include a machine-readable medium 522 on which is stored one or more sets of instructions (e.g., software 524) embodying any one or more of the methodologies or functions described herein, including those methods illustrated in herein above. The instructions 524 may also reside, completely or at least partially, within the main memory 504, the static memory 506, and/or within the processor 502 during execution thereof by the computer system 500. The main memory 504 and the processor 502 also may constitute machine-readable media. Dedicated hardware implementations including, but not limited to, application specific integrated circuits, programmable logic arrays and other hardware devices can likewise be constructed to implement the methods described herein. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the present invention, the methods described herein are intended for operation as software programs running on a computer processor. Furthermore, software implementations can include, but not limited to, distributed processing or component/object distributed processing, parallel processing, or virtual machine processing can also be constructed to implement the methods described herein.

The present invention contemplates a machine readable medium containing instructions 524, or that which receives and executes instructions 524 from a propagated signal so that a device connected to a network environment 526 can send or receive voice, video or data, and to communicate over the network 526 using the instructions 524. The instructions 524 may further be transmitted or received over a network 526 via the network interface device 520. The machine readable medium may also contain a data structure for containing data useful in providing a functional relationship between the data and a machine or computer in an illustrative embodiment of the disclosed system and method.

While the machine-readable medium 522 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present invention. The term "machine-readable medium" shall accordingly be taken to include, but not be limited to: solid-state memories such as a memory card or other package that houses one or more read-only (non-volatile) memories, random access memories, or other re-writable (volatile) memories; magneto-optical or optical medium such as a disk or tape; and/or a digital file attachment to e-mail or other self-contained information archive or set of archives is considered a distribution medium equivalent to a tangible storage medium. Accordingly, the invention is considered to include any one or more of a machine-readable medium or a distribution medium, as listed herein and including art-recognized equivalents and successor media, in which the software implementations herein are stored.

Although the present specification describes components and functions implemented in the embodiments with reference to particular standards and protocols, the invention is not limited to such standards and protocols. Each of the standards for Internet and other packet switched network transmission (e.g., TCP/IP, UDP/IP, HTML, and HTTP) represent examples of the state of the art. Such standards are periodically superseded by faster or more efficient equivalents having essentially the same functions. Accordingly, replacement standards and protocols having the same functions are considered equivalents.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. Other embodiments may be utilized and derived there from, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A method for distributing advertising video data in an internet protocol television (IPTV) system, the method comprising:

dynamically dividing a plurality of end user devices in the IPTV system into a quantity K advertising groups based on end user profile data for the plurality of end user devices;

IF K is less than a first integer, M selected based the IPTV system available bandwidth, replicating each of N IPTV channels for each of the K advertising groups;

inserting into each replicated IPTV channels in each advertising group, advertising data selected for the advertising group;

sending the N times K IPTV channels to an IPTV server close to the plurality of end user devices;

ELSEIF K is greater than or equal to the quantity M, THEN sending a quantity of N IPTV channels to an IPTV server close to the plurality of end user devices;

dynamically determining a percentile ranking relative to a predetermined percentile ranking for each of the plurality of end user devices, wherein the ranking is based on end user profile data for each end user device and available IPTV bandwidth wherein the predetermined percentile ranking is based on a first percentage of end user devices that will fit within a second percentage of multicast groups;

placing a quantity of the plurality of end user devices having the a percentile ranking above the predetermined percentile ranking into J advertising groups and assigning each of a quantity I of the plurality of end user devices having a ranking below the predetermined percentile ranking to one of a quantity of I unicasts;

concurrently multicasting to the quantity J of advertising video data multicast groups at a first advertising data multicast speed to each of a plurality of end user devices in the J advertising groups and the quantity K of multicast video data channels at a second multicast speed to all end users in the K advertising groups, wherein the second multicast speed is faster than the first multicast speed and wherein the quantity K of video data channels have empty advertising data slots which are filled at the end user devices with the advertising video data received in the quantity J multicasts of advertising video data transmitted from the server to the plurality of end user devices in the J advertising groups, wherein the end users in the J advertising groups have a percentile ranking above or equal to a predetermined percentile ranking; and unicasting from the server, advertising video data channels with advertising included in the unicasting for actively viewed television channels to each of a quantity I of end users having a percentile ranking below the predetermined percentile ranking for insertion of the unicast advertising data into the multicast video data stream, wherein the quantity I of end users is the number of end users below the predetermined percentage and the quantity J comprises the number of advertising groups for end users above the predetermined percentile ranking.

2. The method of claim 1, wherein the advertising video data channels are only unicast and multicast for actively viewed IPTV channels.

3. The method of claim 1, wherein the predetermined percentile ranking, I, J and M are selected based on IPTV system available bandwidth between the IPTV server and the end user devices.

4. The method of claim 3, wherein the predetermined percentile ranking is substantially 80% and M is equal to 5.

5. The method of claim 1, the method further comprising:
sending channel assignment data to the end user devices indicating internet protocol addresses for IPTV channels and advertising data for the IPTV channels.

6. The method of claim 1, wherein the advertising data in the unicasts are inserted into one of the N IPTV channels at the quantity I end user devices.

7. A system for distributing advertising data in an internet protocol television (IPTV) system, the system comprising:
a computer readable memory;
a processor in data communication with the memory; and
a computer program embedded in the memory, the computer program further comprising instructions that when executed by a computer perform functions to:
dynamically divide a plurality of end user devices in the IPTV system into a quantity K advertising groups based on end user profile data for the plurality of end user devices;
instructions to,
IF K is less than a first integer, M, wherein M is selected based on the IPTV system available bandwidth,
replicate each of N of IPTV channels for each of the K advertising groups;
insert into each replicated IPTV channel for each respective advertising group, advertising data selected for the advertising group;
send the N times K IPTV channels to an IPTV server close to the plurality of end user devices;
ELSEIF K is greater than or equal to M, THEN
instructions to
send a quantity of N IPTV channels to an IPTV server close to the plurality of end user devices;
dynamically determine a percentile ranking relative to a predetermined percentile ranking for each of the plurality of end user devices,
wherein the a percentile ranking is based on end user profile data for each of the plurality of end user devices and available IPTV system bandwidth,
wherein the a predetermined percentile ranking is based on a first percentage of end user devices that will fit within a second percentage of multicast groups;
ELSEIF K is greater than or equal to the quantity M, THEN
instructions to
place a quantity of the plurality of end user devices having the a percentile ranking above the predetermined percentile ranking into J advertising groups, instructions to multicast a quantity J of advertising data multicast groups at a first multicast speed and a quantify K of multicast video data channels at a second multicast speed faster than the first multicast speed and wherein the video data channels have empty advertising data slots which are filled at the end user devices with the advertising video data received in the first multicast of advertising video data from the server to a plurality of end user devices in the J advertising groups, and assigning each of a quantity I of the plurality of end user devices having the a percentile ranking below the a predetermined percentile ranking to one of a quantity of I unicasts; wherein the end users in the J advertising groups have a percentile ranking above or equal to a predetermined percentile ranking; and
concurrently multicast to the quantity J of advertising video data multicast groups at a fist advertising data multicast speed to each of a plurality of end user devices in the J advertising groups and the quantity K of multicast video data channels at a second multicast speed to all end user sin the K advertising groups, wherein the second multicast speed is faster than the first multicast speed and wherein the quantity K video data channels have empty advertising data slots which are filled at the end user devices with the advertising video data received in the quantity J multicasts of advertising video data transmitted from the server to the plurality of end user device in the J advertising groups, wherein the end user in the J advertising groups have a percentile ranking above or equal to a predetermined percentile ranking and instructions to unicast from the server, advertising video data channels with advertising included in the unicasting for actively viewed television channels to a quantity I of end users having a percentile ranking below the predetermined percentile ranking for insertion of the unicast advertising data into the multicast video data channels at the end user devices, wherein the quantity I of end users is the number of end users below the predetermined percentile ranking and the quantity J comprises the number of adverting groups for end users above the predetermined percentile ranking.

8. The system of claim 7, wherein the predetermined percentile ranking, I, J, and M are selected based on IPTV system available bandwidth between the IPTV server and the end user devices.

9. The system of claim 7, wherein the predetermined percentile ranking is substantially 80%.

10. The system of claim 7, the computer program further comprising:
instructions to send channel assignment data to the end user devices indicating internet protocol addresses for IPTV channels and advertising data for the IPTV channels.

11. The system of claim 7, wherein the advertising data in the unicasts are inserted into one of the N IPTV channels at quantity I end user devices respectively.

12. A tangible computer readable non-transitory medium containing a computer program, that when executed by a computer performs functions that are useful for distributing advertising data in an internet protocol television (IPTV) system, the computer program comprising:
instructions to:
dynamically divide a plurality of end user devices in the IPTV system into a quantity K advertising groups based on end user profile data for the plurality of end user devices;
instructions to,
IF K is greater than a first integer, M, wherein M is selected based on the IPTV system available bandwidth,
replicate each of N IPTV channels for each of the K advertising groups;
insert into each replicated IPTV channel for each respective advertising group, advertising data selected for the advertising group; and
send N times K IPTV channels to an IPTV server close to the plurality of end user devices;
ELSEIF K is greater than or equal to the quantity M, THEN
instructions to,
place a quantity of the plurality of end user devices having a percentile ranking above the predetermined percentile ranking into J advertising groups,
dynamically determine a percentile ranking relative to a predetermined percentile ranking for each of the plurality of end user devices, wherein the predetermined percentile ranking is based on end user profile data for each end user device and available IPTV bandwidth;
wherein the a predetermined percentile ranking is based on a first percentage of end user devices that will fit within a second percentage of multicast groups;
instructions to,
place a quantity of the plurality of end user devices having the a percentile ranking above the predetermined percentile ranking into J advertising groups and assigning each of a quantity I of the plurality of end user devices having the a percentile ranking below the a predetermined percentile ranking to one of a quantity of I unicasts;
concurrently multicast to the quantity J of advertising video data multicast groups at a first advertising data multicast speed to each of a plurality of end user devices in the J advertising groups and the quantity K of multicast video data channels at a second multicast speed to all end users in the K advertising groups,
wherein the second multicast speed is faster than the first multicast speed and
wherein the quantity K video data channels have empty advertising data slots which are filled at the end user devices with the advertising video data received in the quantity J multicast of advertising video data transmitted from the server to the plurality of end user devices in the J advertising groups,
wherein the end users in the J advertising groups have a percentile ranking above or equal to a predetermined percentile ranking; and
instructions to,
unicast from the server, advertising video data channels with advertising included in the unicasting for actively viewed television channels to each of the quantity I of end users having the a percentile ranking below the predetermined percentile ranking for insertion of the unicast advertising data into the multicast video data channels is at the end user devices,
wherein the quantity I of end users is the number of end users below the predetermined percentile ranking and the quantity J comprise the number advertising groups for end users above the predetermined percentile ranking.

13. The medium of claim 12, wherein the predetermined percentile ranking, I, J, and M are selected based on IPTV system available bandwidth between the IPTV server and the end user devices.

14. The medium of claim 12, wherein the predetermined percentile ranking is substantially 80%.

15. The medium of claim 12, the computer program further comprising:
instructions to,
send channel assignment data to the end user devices indicating internet protocol addresses for IPTV channels and advertising data for the IPTV channels.

16. The medium of claim 12, wherein the advertising data in the unicasts are inserted into one of the N IPTV channels at the quantity I of end user devices respectively.

* * * * *